United States Patent
Kang et al.

(10) Patent No.: US 10,291,601 B2
(45) Date of Patent: May 14, 2019

(54) METHOD FOR MANAGING CONTACTS IN ELECTRONIC DEVICE AND ELECTRONIC DEVICE THEREOF

(71) Applicant: Samsung Electronics Co., Ltd., Gyeonggi-do (KR)

(72) Inventors: Ik-Seon Kang, Gyeonggi-do (KR); Young-Sik Yoon, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 282 days.

(21) Appl. No.: 15/219,435

(22) Filed: Jul. 26, 2016

(65) Prior Publication Data
US 2017/0054678 A1    Feb. 23, 2017

(30) Foreign Application Priority Data
Aug. 18, 2015    (KR) .......................... 10-2015-0116267

(51) Int. Cl.
*G06F 15/16*   (2006.01)
*H04L 29/06*   (2006.01)
*H04L 29/12*   (2006.01)
*H04L 12/58*   (2006.01)

(52) U.S. Cl.
CPC .............. *H04L 63/08* (2013.01); *H04L 51/22* (2013.01); *H04L 61/1594* (2013.01); *H04L 63/20* (2013.01)

(58) Field of Classification Search
CPC .............................. H04L 63/08; H04L 63/20
See application file for complete search history.

(56) References Cited

U.S. PATENT DOCUMENTS

2009/0150968 A1* 6/2009 Ozzie ....................... H04L 63/08
726/1
2010/0138781 A1    6/2010 Korhonen et al.

* cited by examiner

*Primary Examiner* — Kyung H Shin
(74) *Attorney, Agent, or Firm* — Cha & Reiter LLC

(57) ABSTRACT

An electronic device according to various embodiments of the present disclosure may include a communication module configured to receive a message associated with a plurality of recipients, a memory configured to store one or more contacts; and a processor coupled to the communication module and the memory, the processor configured to identify at least one contact among the one or more contacts that corresponds to at least one recipient among the plurality of recipients, and store the identified at least one contact in a particular group. Other embodiments are possible and several of which are disclosed.

7 Claims, 10 Drawing Sheets

FIG.10A  FIG.10B

METHOD FOR MANAGING CONTACTS IN ELECTRONIC DEVICE AND ELECTRONIC DEVICE THEREOF

CLAIM OF PRIORITY

This application claims the benefit under 35 U.S.C. § 119(a) of a Korean patent application filed in the Korean Intellectual Property Office on Aug. 18, 2015 and assigned Ser. No. 10-2015-0116267, the entire disclosure of which is incorporated herein by reference.

TECHNICAL FIELD

Various embodiments of the present disclosure relate to a method for managing contacts in an electronic device and an electronic device thereof.

BACKGROUND

Generally, electronic devices such as smart phones and tablet personal computers (PCs) may include contact applications, messenger applications, Email applications and the like, and a user of the electronic device may manage contacts through these applications.

For example, an electronic device may store contacts by receiving a name, and a phone number, an address, an Email address and/or a photo corresponding to the name through the contact application. These data may be inputted by the user. Further, the electronic device may store contacts by receiving a name, and an identifier (ID) and/or a phone number corresponding to the name through the messenger application. Moreover, the electronic device may store contacts by receiving a name, and an Email address corresponding to the name through the Email application.

Conventionally, when specifying the groups of family, colleagues, friends and others for the contacts in order to separately manage the contacts, the user would inconveniently specify the groups one by one manually. Accordingly, due to this inconvenience, most users may leave the contacts ungrouped.

Further, conventionally, when the user, for example, enters a new contact with a new name, the new name may be the same as the name of an existing (stored) contact. This is the case when two contacts share the same name, for example two "John Smith"s. The electronic device may store the contact information for these two contacts and display them without distinguishing the two contacts, causing confusion for the user.

The above information is presented as background information only to assist with an understanding of the present disclosure. No determination has been made, and no assertion is made, as to whether any of the above might be applicable as prior art with regard to the present disclosure.

SUMMARY

Accordingly, an aspect of one or more embodiments of the present disclosure is to provide a method for managing contacts in an electronic device, in which groups of contacts stored in the electronic device can be automatically created, and an electronic device thereof.

Further, an aspect of one or more embodiments of the present disclosure is to provide a method for managing contacts in an electronic device, in which contacts of same names can be stored separately, and an electronic device thereof.

In accordance with an aspect of the present disclosure, an electronic device may include a communication module configured to receive a message associated with a plurality of recipients, a memory configured to store one or more contacts; and a processor coupled to the communication module and the memory, the processor configured to identify at least one contact among the one or more contacts that corresponds to at least one recipient among the plurality of recipients, and store the identified at least one contact in a particular group.

In accordance with another aspect of the present disclosure, an electronic device may include an input unit configured to receive a first name corresponding to a first contact, a memory configured to store at least a second contact including a second name, and a processor, coupled to the input unit and the memory, configured to determine whether the first name corresponds to the second name, identify additional information of the first contact that distinguishes the first contact from the second contact when the first name corresponds to the second name, and store the identified additional information in the memory in association with the first contact.

In accordance with further another aspect of the present disclosure, a method for managing contacts in an electronic device may include receiving a message associated with a plurality of recipients, identifying at least one contact among one or more contacts stored in a memory of the electronic device that corresponds to at least one recipient among the plurality of recipients, and storing the identified at least one contact in a particular group for a subsequent display.

In accordance with yet another aspect of the present disclosure, a method for managing contacts in an electronic device may include receiving a first name corresponding to a first contact, storing at least a second contact including a second name in a memory of the electronic device, determining whether the first name corresponds to the second name, identifying additional information of the first contact that distinguishes the first contact from the second contact when the first name corresponds to the second name, and storing the identified additional information in the memory in association with the first contact.

Other aspects, advantages, and salient features of the disclosure will become apparent to those skilled in the art from the following detailed description, which, taken in conjunction with the accompanying drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 10A and FIG. 10B illustrate screens for an operation of distinguishing contacts sharing the same name according to one embodiment of the present disclosure.

Throughout the drawings, like reference numerals will be understood to refer to like parts, components, and structures.

DETAILED DESCRIPTION

Figure 1:
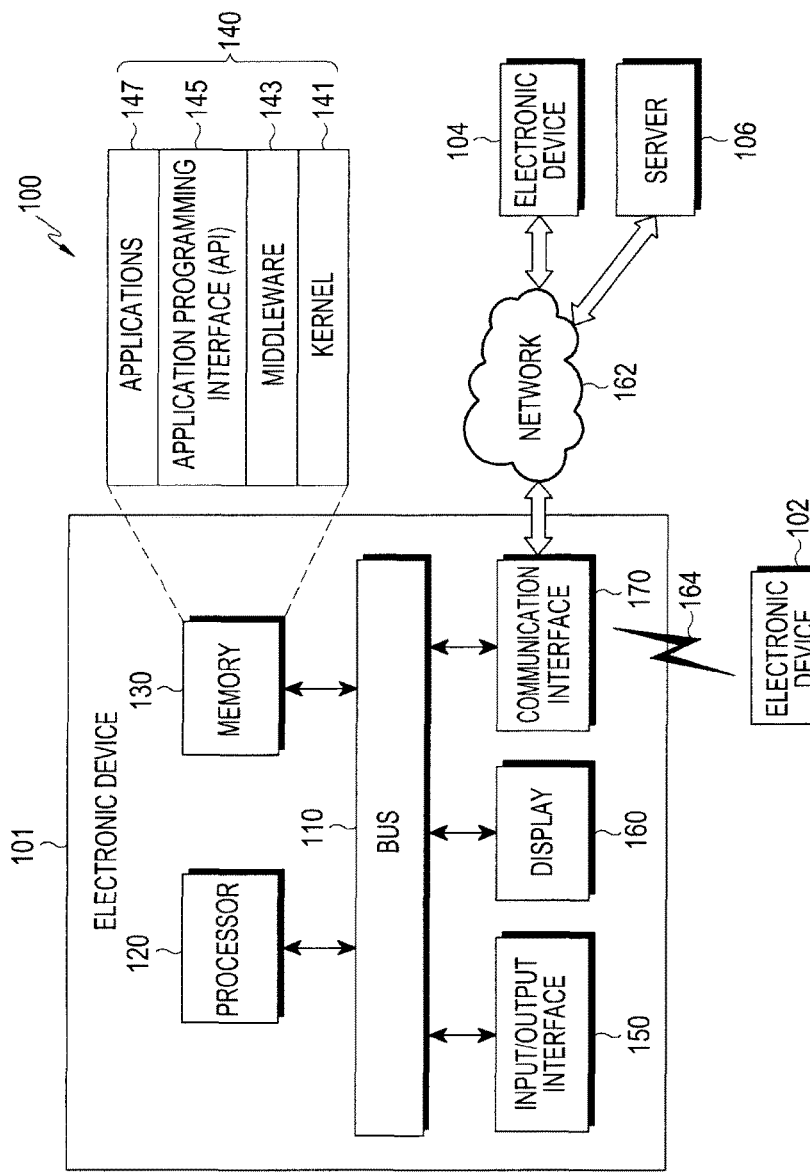
FIG. 1 illustrates a network environment according to various embodiments of the present disclosure.

Hereinafter, various embodiments of the present disclosure will be disclosed with reference to the accompanying drawings. However, the present disclosure is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various exemplary embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used for only describing a specific exemplary embodiment and may not have an intention to limit the scope of other exemplary embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that terms defined in general dictionaries among terms used herein have the same meaning as or a meaning similar to that of a context of related technology and are not analyzed as an ideal or excessively formal meaning unless explicitly defined. In some case, terms defined in the present disclosure cannot be analyzed to exclude the present exemplary embodiments.

An electronic device according to various embodiments of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. In various embodiments, the wearable device may include at least one of an accessory-type wearable device (e.g., a watch, a ring, a bracelet, an anklet, a necklace, glasses, a contact lens, or a head mounted device (HMD)), a fabric/clothing-integrated wearable device (e.g., electronic clothing), a body-mounted wearable device (e.g., a skin pad or tattoo), or a bio-implantable wearable device (e.g., a implantable circuit).

In various embodiments, the electronic device may be a home appliance. The home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a gaming console (e.g., Xbox™ or PlayStation™), an electronic dictionary, an electronic key, a camcorder or a digital photo frame.

In another embodiment, the electronic device may include at least one of various medical devices (e.g., various portable medical meters (e.g., a blood glucose meter, a heart rate meter, a blood pressure meter, a body temperature meter or the like), a magnetic resonance angiography (MRA) device, a magnetic resonance imaging (MRI) device, a computed tomography (CT) device, a medical camcorder, an ultrasonic device or the like), a navigation device, a global navigation satellite system (GNSS), an event data recorder (EDR), a flight data recorder (FDR), an automotive infotainment device, a marine electronic device (e.g., a marine navigation device, a gyro compass or the like), avionics, a security device, a car head unit, an industrial or household robot, an automatic teller's machine (ATM) for banks, point of sales (POS) for shops, or an Internet of things (IoT) device (e.g., an electric bulb, various sensors, an electricity or gas meter, a sprinkler device, a fire alarm, a thermostat, a streetlamp, a toaster, fitness equipment, a hot water tank, a heater, a boiler or the like).

In some embodiments, the electronic device may include at least one of a part of the furniture or building/structure, an electronic board, an electronic signature receiving device, a projector, or various meters (e.g., meters for water, electricity, gas or radio waves). In various embodiments, the electronic device may be one or a combination of the above-described various devices. An electronic device according to some embodiments may be a flexible electronic device. Further, an electronic device according to an embodiment of the present disclosure will not be limited to the above-described devices, and may include a new electronic device provided by the development of technology.

Now, an electronic device according to various embodiments of the present disclosure will be described with reference to the accompanying drawings. As used herein, the term "user" may refer to a person who uses the electronic device, or a device (e.g., an intelligent electronic device) that uses the electronic device.

FIG. 1 is a diagram illustrating a network environment according to various embodiments of the present disclosure.

Referring to FIG. 1, an electronic device 101 within a network environment 100 in various embodiments is disclosed. The electronic device 101 may include a bus 110, a processor 120, a memory 130, an input/output (I/O) interface (also known as an input unit) 150, a display 160 and a communication interface (also known as a communication module) 170. In some embodiments, the electronic device 101 may omit at least one of the components, or may additionally include other embodiments.

The bus 110 may include, for example, a circuit that connects the components 120 to 170 to each other, and transfers the communication (e.g., a control message and/or data) between the components 120 to 170.

The processor 120 may include one or more of a central processing unit (CPU), an application processor (AP) or a communication processor (CP). The processor 120 may, for example, execute a control and/or communication-related operation or data processing for at least one other component of the electronic device 101. An artisan understands and appreciates that a "processor" or "microprocessor" constitute hardware in the claimed invention. Under the broadest reasonable interpretation, the appended claims constitute statutory subject matter in compliance with 35 U.S.C. § 101.

In one embodiment, the processor 120 may control to receive a message transmitted to a plurality of recipients through the communication interface 170. Further, the processor 120 may identify at least one contact corresponding to the plurality of recipients, which is included in the received message, among the contacts stored in the memory 130. Further, the processor 120 may group the identified contact among the contacts stored in the memory 130 in one group.

In one embodiment, the received message may include an electronic mail, an instant message, a short message or a multi-media message.

In one embodiment, the processor 120 may determine at least one contact matching the plurality of recipients among the stored contacts, as the at least one contact corresponding to the plurality of recipients among the stored contacts.

In one embodiment, the processor 120 may display information corresponding to the identified contact on the display 160. Further, the processor 120 may display, on the display 160, a user interface to receive a user input for grouping the identified contact in one group. Further, the processor 120 may group the identified contact in one group, if the user interface is selected based on a user input entered through the I/O interface 150.

In one embodiment, the processor 120 may display a screen corresponding to the group.

In one embodiment, if there is a correspondence between two names of two contacts, the processor 120 may extract or identify additional information for one or both of the contacts. One of the contacts may be entered through the I/O interface 150, and may include one of the names. Further, the processor 120 may control to store the additional information in the memory 130 in association with the appropriate contact.

In one embodiments, if a first name is entered through I/O interface 150 on a contact entry screen displayed on the display 160, the processor 120 may determine whether there is a second name corresponding to the first name among the contacts stored in the memory 130.

In one embodiment, if a user input is entered through the I/O interface 150 in order to store the first contact entered on the contact entry screen, the processor 120 may determine whether there is a second name corresponding to the first name among the contacts stored in the memory 130.

In one embodiment, the processor 120 may identify profile information corresponding to a contact by accessing at least one of an Email service, a social networking service or a messenger service corresponding to the first contact through the communication interface 170. Further, the processor 120 may determine grouping or affiliation information of a contact using the profile information. The grouping information may include a variety of groups such as, for example, as friends, family, colleagues or others. The processor 120 may then add additional information from the profile or grouping information to the contacts stored in memory 130.

In one embodiment, the processor 120 may control the display 160 to display the identified additional information on the display 160.

In one embodiments, the processor 120 may control to display, on the display 160, the identified additional information and a user interface ask for user input regarding whether to associate the identified additional information with a contact. Further, the processor 120 may control to associate the extracted or identified additional information with the corresponding contact depending on the user input entered through the I/O interface 150.

In one embodiment, if there is a correspondence between two names of two contacts, the processor 120 may extract additional information of a contact, if it is determined that the contact does not correspond to any of the contacts currently stored in the memory 130.

In one embodiment, if there is a correspondence between two names of two contacts, the processor 120 may control to extract or identify additional information of the second name; store the extracted additional information in the memory 130 in association with the second name; and control the display 160 to display the additional information of the second name on the display 160 in association with the second name.

The memory 130 may include a volatile and/or non-volatile memory. The memory 130 may, for example, store a command or data related to at least one other component of the electronic device 101. For example, the memory 130 may store the contacts. Further, for example, the memory 130 may store at least one contact, and a name corresponding to the contact. In one embodiment, the memory 130 may store software and/or a program 140. The program 140 may include, for example, a kernel 141, a middleware 143, an application programming interface (API) 145, and/or an application program(s) (or 'application') 147. At least some of the kernel 141, the middleware 143 or the API 145 may be referred to as an operating system (OS).

The kernel 141 may, for example, control or manage the system resources (e.g., the bus 110, the processor 120, the memory 130 or the like) that are used to execute the operation or function implemented in other programs (e.g., the middleware 143, the API 145, the application program 147 or the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, the middleware 143 may process one or more work requests received from the application program 147 according to their priority. For example, the middleware 143 may give a priority to use the system resources (e.g., the bus 110, the processor 120, the memory 130 or the like) of the electronic device 101, to at least one of the application programs 147. For example, the middleware 143 may process the one or more work requests according to the priority given to at least one of the application programs 147, thereby performing scheduling or load balancing for the one or more work requests.

The API 145 is, for example, an interface by which the application program 147 controls the function provided in the kernel 141 or the middleware 143, and may include, for example, at least one interface or function (e.g., an instruction) for file control, window control, image processing or character control.

The I/O interface 150 may, for example, serve as an interface that can transfer a command or data received from the user or other external devices to the other components of the electronic device 101. For example, the I/O interface may receive a user input. Further, the I/O interface 150 may output a command or data received from the other components of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by, for example, an electronic pen or a part of the user's body. Further, the display 160 may be functionally connected to the electronic device 101.

The communication interface 170 may, for example, establish communication between the electronic device 101 and an external device (e.g., a first external electronic device 102, a second external electronic device 104 or a server 106). For example, the communication interface 170 may communicate with the external device (e.g., the second external electronic device 104 or the server 106) by being connected to a network 162 through wireless communication or wired communication.

The wireless communication may include at least one of, for example, long term evolution (LTE), long term evolution-advanced (LTE-A), code division multiple access (CDMA), wideband code division multiple access (WCDMA), universal mobile telecommunications system (UMTS), wireless broadband (WiBro) or global system for mobile communications (GSM), as a cellular communication protocol. Further, the wireless communication may include, for example, short-range communication 164. The short-range communication 164 may include at least one of, for example, wireless fidelity (WiFi), Bluetooth (BT), near field communication (NFC) or global navigation satellite system (GNSS). GNSS may include at least one of, for example, global positioning system (GPS), global navigation satellite system (Glonass), navigation satellite system (Beidou or Galileo), or the European global satellite-based navigation system depending on the use area or the bandwidth. Herein, "GPS" may be interchangeably used with "GNSS". The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet, or the telephone network.

Each of the first and second external electronic devices 102 and 104 may be identical or non-identical in type to the electronic device 101. In one embodiment, the server 106 may include a group of one or more servers. In various embodiments, all or some of the operations executed in the electronic device 101 may be executed in one or multiple other electronic devices (e.g., the external electronic devices 102 and 104 or the server 106). In one embodiment, in a case where the electronic device 101 should perform a certain function or service automatically or upon request, the electronic device 101 may send a request for at least some of the functions related thereto to other electronic devices (e.g., the external electronic devices 102 and 104 or the server 106), instead of or in addition to spontaneously executing the function or service. The other electronic devices (e.g., the external electronic devices 102 and 104 or the server 106) may execute the requested function or additional function, and transfer the results to the electronic device 101. The electronic device 101 may process the received results intact or additionally, to provide the requested function or service. To this end, for example, the cloud computing, distributed computing, or client-server computing technology may be used.

Figure 2:
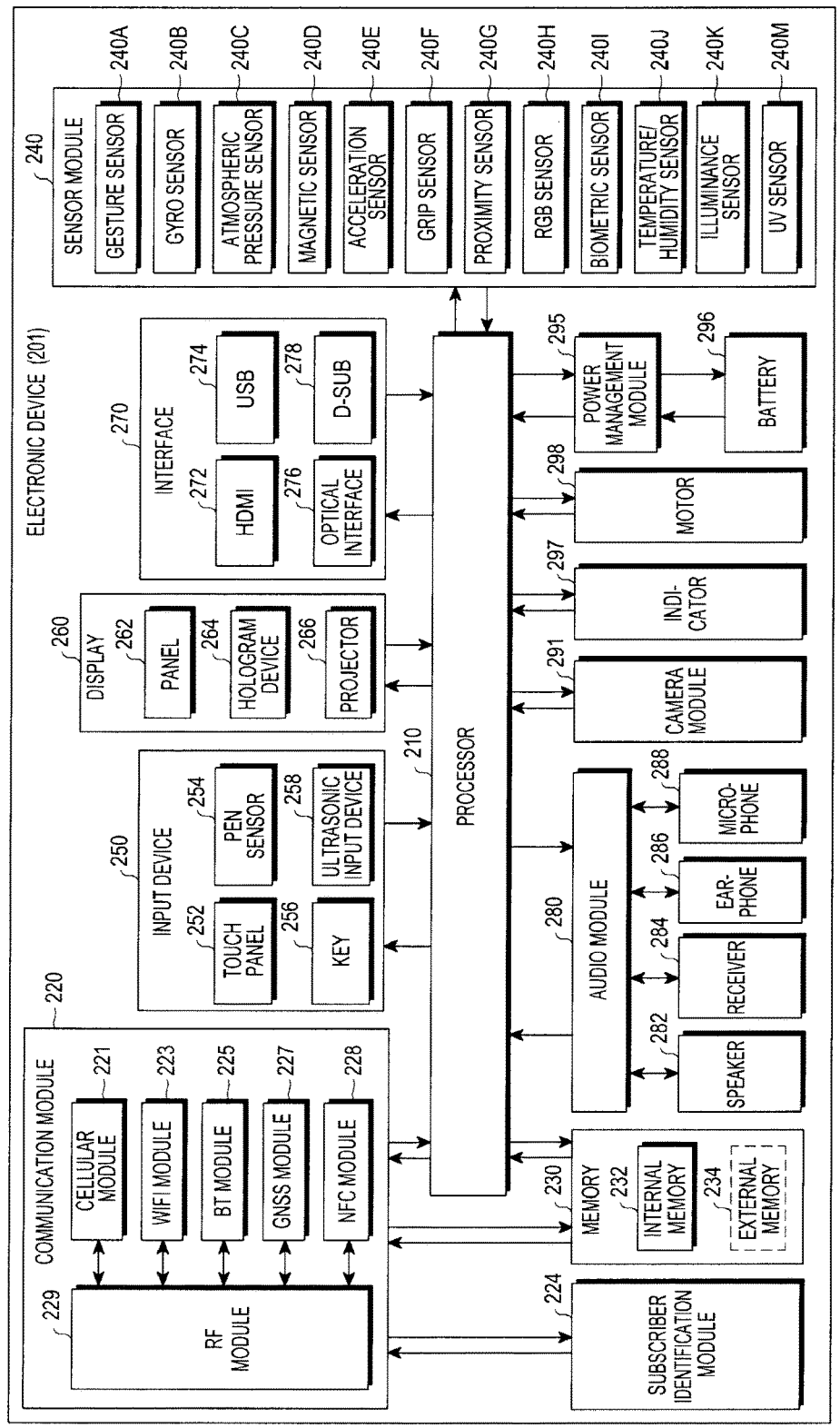
FIG. 2 illustrates a block diagram of an electronic device according to various embodiments of the present disclosure.

FIG. 2 is a block diagram of an electronic device 201 according to various embodiments of the present disclosure. The electronic device 201 may include, for example, the entirety or a part of the electronic device 101 shown in FIG. 1. The electronic device 201 may include at least one processor (e.g., application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, control a plurality of hardware or software components connected to the processor 210 by running the operating system or application program, and may process and compute a variety of data. The processor 210 may be implemented in, for example, a system on chip (SoC). In one embodiment, the processor 210 may further include a graphic processing unit (GPU) and/or an image signal processor (ISP). The processor 210 may include at least some (e.g., a cellular module 221) of the components shown in FIG. 2. The processor 210 may load, on a volatile memory, a command or data received from at least one of other components (e.g., a non-volatile memory) and process the loaded data, and may store a variety of data in a non-volatile memory.

The communication module 220 may be identical or similar in structure to the communication interface 170 in FIG. 1. The communication module 220 may include, for example, the cellular module 221, a WiFi module 223, a Bluetooth (BT) module 225, a GNSS module 227 (e.g., a GPS module, a Glonass module, a Beidou module or a Galileo module), an NFC module 228, and a radio frequency (RF) module 229.

The cellular module 221 may, for example, provide a voice call service, a video call service, a messaging service or an Internet service over a communication network. In one embodiment, the cellular module 221 may perform identification and authentication for the electronic device 201 within the communication network using the subscriber identification module (e.g., a SIM card) 224. In one embodiment, the cellular module 221 may perform at least some of the functions that can be provided by the processor 210. In one embodiment, the cellular module 221 may include a communication processor (CP).

Each of the WiFi module 223, the BT module 225, the GNSS module 227 or the NFC module 228 may include, for example, a processor for processing the data transmitted or received through the corresponding module. In some embodiments, at least some (e.g., two or more) of the cellular module 221, WiFi module 223, the BT module 225, the GNSS module 227 or the NFC module 228 may be included in one integrated chip (IC) or IC package.

The RF module 229 may, for example, transmit and receive communication signals (e.g., RF signals). The RF module 229 may include, for example, a transceiver, a power amplifier module (PAM), a frequency filter, a low noise amplifier (LNA), or an antenna. In another embodiment, at least one of the cellular module 221, the WiFi module 223, the BT module 225, the GNSS module 227 or the NFC module 228 may transmit and receive RF signals through its own separate RF module.

The subscriber identification module 224 may include, for example, a card with a subscriber identification module and/or an embedded SIM. The subscriber identification module 224 may include unique identification information (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like), hard drive, or solid state drive (SSD)).

The external memory 234 may further include a flash drive, for example, compact flash (CF), secure digital (SD), micro secure digital (Micro-SD), mini secure digital (Mini-SD), extreme digital (xD), a multi-media card (MMC), a memory stick or the like. The external memory 234 may be functionally and/or physically connected to the electronic device 201 through various interfaces.

The sensor module 240 may, for example, measure the physical quantity or detect the operating status of the electronic device 201, and convert the measured or detected information into an electrical signal. The sensor module 240 may include at least one of, for example, a gesture sensor 240A, a gyro sensor 240B, a barometric pressure sensor 240C, a magnetic sensor 240D, an acceleration sensor 240E, a grip sensor 240F, a proximity sensor 240G, a color sensor (e.g., red-green-blue (RGB) sensor) 240H, a biometric sensor 240I, a temperature/humidity sensor 240J, an illuminance sensor 240K, or a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling at least one or more sensors belonging thereto. In some embodiments, the electronic device 201 may further include a processor configured to control the sensor module 240, independently of or as a part of the processor 210, thereby to control the sensor module 240 while the processor 210 is in a sleep state.

The input device 250 may include, for example, a touch panel 252, a (digital) pen sensor 254, a key 256, or an ultrasonic input device 258. The touch panel 252 may, for example, use at least one of the capacitive, resistive, infrared or ultrasonic schemes. The touch panel 252 may further include a control circuit. The touch panel 252 may further include a tactile layer, to provide a tactile or haptic feedback to the user.

The (digital) pen sensor 254, for example, may be a part of the touch panel 252, or may include a separate recognition sheet. The key 256 may include, for example, a physical button, an optical key or a keypad. The ultrasonic input device 258 may detect ultrasonic waves generated in an input tool using a microphone (e.g., a microphone 288), to identify the data corresponding to the detected ultrasonic waves.

The display 260 (e.g., the display 160) may include a panel 262, a hologram device 264, or a projector 266. The panel 262 may be identical or similar in structure to the display 160 in FIG. 1. The panel 262 may, for example, be implemented to be flexible, transparent or wearable. The panel 262, together with the touch panel 252, may be implemented as one module. The hologram device 264 may show stereoscopic images in the air using the interference of the light. The projector 266 may display images by projecting the light onto the screen. The screen may, for example, be disposed on the inside or outside of the electronic device 201. In one embodiment, the display 260 may further include a control circuit for controlling the panel 262, the hologram device 264, or the projector 266.

The interface 270 may include, for example, an HDMI 272, a USB 274, an optical interface 276 or a D-subminiature (D-sub) 278. The interface 270 may, for example, be included in the communication interface 170 shown in FIG. 1. Additionally or alternatively, the interface 270 may include, for example, a mobile high-definition link (MHL) interface, a secure digital (SD) card/multi-media card (MMC) interface or an infrared data association (IrDA) interface.

The audio module 280 may, for example, convert the sounds and the electrical signals bi-directionally. At least some components of the audio module 280 may, for example, be included in the I/O interface 150 shown in FIG. 1. The audio module 280 may, for example, process the sound information that is input or output through a speaker 282, a receiver 284, an earphone 286 or the microphone 288.

The camera module 291 is, for example, a device capable of capturing still images and videos. In one embodiment, the camera module 291 may include one or more image sensors (e.g., a front image sensor or a rear image sensor), a lens, an image signal processor (ISP), or a flash (e.g., an LED or xenon lamp).

The power management module 295 may, for example, manage the power of the electronic device 201. In one embodiment, the power management module 295 may include, for example, a power management integrated circuit (PMIC), a charger integrated circuit (IC), or a battery or fuel gauge. The PMIC may have the wired and/or wireless charging schemes. The wireless charging scheme may include, for example, a magnetic resonance scheme, a magnetic induction scheme, or an electromagnetic scheme, and the power management module 295 may further include additional circuits (e.g., a coil loop, a resonant circuit, a rectifier or the like) for wireless charging. The battery or fuel gauge may, for example, measure the remaining capacity, charging voltage, charging current or temperature of the battery 296. The battery 296 may include, for example, a rechargeable battery and/or a solar battery.

The indicator 297 may indicate specific status (e.g., boot status, message status, charging status or the like) of the electronic device 201 or a part (e.g. the processor 210) thereof. The motor 298 may convert an electrical signal into mechanical vibrations to generate a vibration or haptic effect. Although not shown, the electronic device 201 may include a processing device (e.g., GPU) for mobile TV support. The processing device for mobile TV support may, for example, process the media data that is based on the standards such as digital multimedia broadcasting (DMB), digital video broadcasting (DVB) or MediaFLO™.

Each of the components described herein may be configured with one or more components, names of which may vary depending on the type of the electronic device. In various embodiments, the electronic device may include at least one of the components described herein, some of which may be omitted, or may further include additional other components. Further, some of the components of the electronic device according to various embodiments of the present disclosure may be configured as one entity by being combined, thereby performing the functions of the components before being combined, in the same manner.

Figure 3:
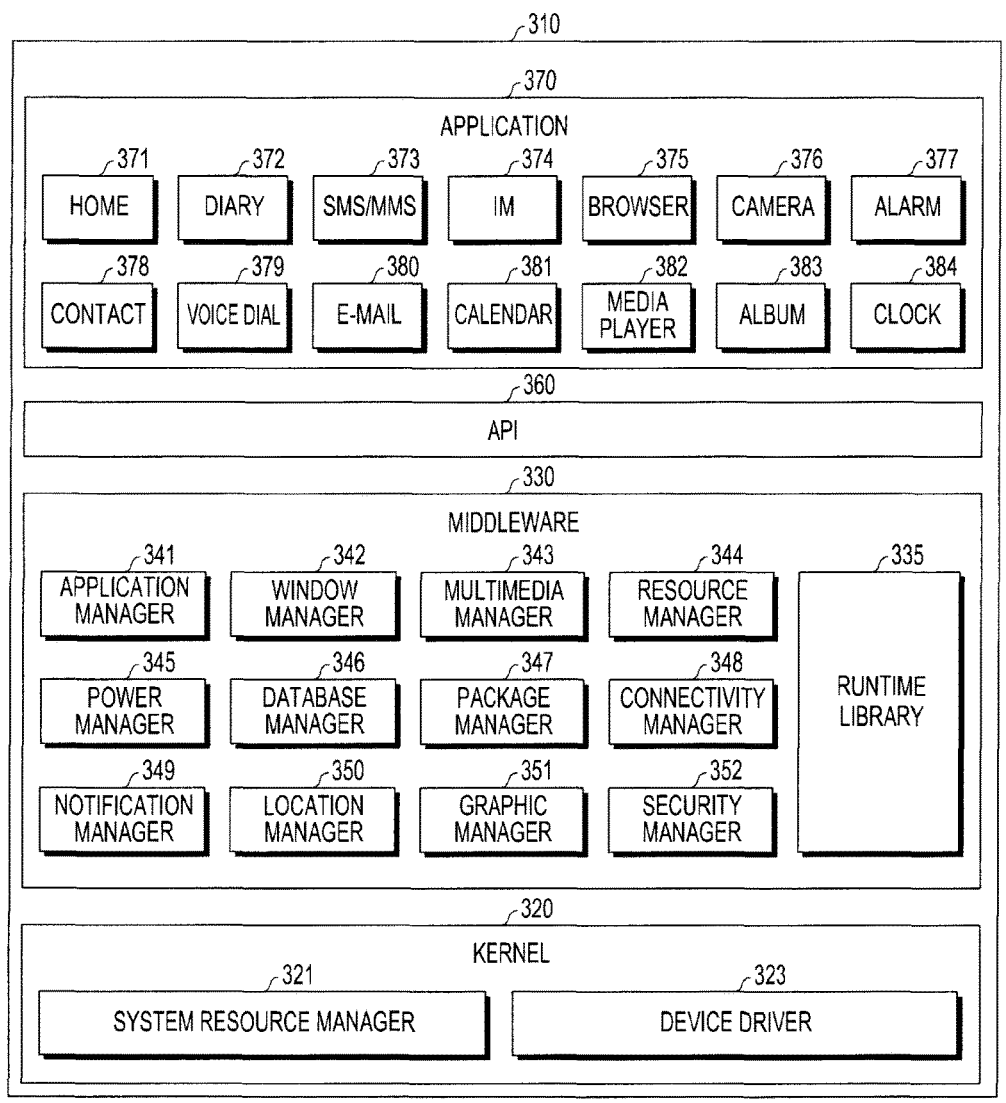
FIG. 3 illustrates a block diagram of a program module according to various embodiments of the present disclosure.

FIG. 3 is a block diagram of a program module according to various embodiments of the present disclosure. In one embodiment, a program module 310 (e.g., the program 140) may include an operating system (OS) for controlling the resources related to the electronic device (e.g., the electronic device 101), and/or a variety of applications (e.g., the application program 147) that run on the operating system. The operating system may be, for example, Android™, iOS™, Windows™, Symbian™, Tizen™, Bada™ or the like.

The program module 310 may include a kernel 320, a middleware 330, an application programming interface (API) 360, and/or an application(s) 370. At least a part of the program module 310 may be preloaded on the electronic device, or downloaded from the external electronic device (e.g., the external electronic devices 102 and 104 and the server 106).

The kernel 320 (e.g., the kernel 141) may include, for example, a system resource manager 321 and/or a device driver 323. The system resource manager 321 may control, allocate or recover the system resources. In one embodiment, the system resource manager 321 may include a process manager, a memory manager, a file system manager or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330, for example, may provide a function that is required in common by the application(s) 370, or may provide various functions to the application 370 through the API 360 so that the application 370 may efficiently use the limited system resources within the electronic device. In one embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function through a programming language while the application 370 is run. The runtime library 335 may perform an I/O management function, a memory management function, an arithmetic function or the like.

The application manager 341 may, for example, manage the life cycle of at least one of the application(s) 370. The window manager 342 may manage the graphic user interface (GUI) resources that are used on the screen. The multimedia manager 343 may determine the format required for playback of various media files, and encode or decode the media files using a codec for the format. The resource manager 344 may manage resources such as a source code, a memory or a storage space, for at least one of the application(s) 370.

The power manager 345, for example, may manage the battery or power by operating with the basic input/output system (BIOS), and provide power information required for an operation of the electronic device. The database manager 346 may create, search or update the database that is to be used by at least one of the application(s) 370. The package manager 347 may manage installation or update of applications that are distributed in the form of a package file.

The connectivity manager 348 may, for example, manage wireless connection such as WiFi or Bluetooth. The notification manager 349 may indicate or notify events such as message arrival, appointments and proximity alerts in a manner that doesn't interfere with the user. The location manager 350 may manage the location information of the electronic device. The graphic manager 351 may manage the graphic effect to be provided to the user, or the user interface related thereto. The security manager 352 may provide various security functions required for the system security or user authentication. In one embodiment, if the electronic device (e.g., the electronic device 101) includes a phone function, the middleware 330 may further include a telephony manager for managing the voice or video call function of the electronic device.

The middleware 330 may include a middleware module that forms a combination of various functions of the above-described components. The middleware 330 may provide a module specialized for each type of the operating system in order to provide a differentiated function. Further, the middleware 330 may dynamically remove some of the existing components, or add new components.

The API 360 (e.g., the API 145), for example, is a set of API programming functions, and may be provided in a different configuration depending on the operating system. For example, for Android™ or iOS™, the API 360 may provide one API set per platform, and for Tizen™, the API 360 may provide two or more API sets per platform.

The application 370 (e.g., the application program 147) may include, for example, one or more applications capable of performing such functions as a home 371, a dialer 372, a short message service/multimedia messaging service (SMS/MMS) 373, an instant message (IM) 374, a browser 375, a camera 376, an alarm 377, a contact 378, a voice dial 379, an Email 380, a calendar 381, a media player 382, an album 383, a clock 384, healthcare (e.g., a function for measuring the quantity of exercise, the blood glucose or the like), or environmental information provision (e.g., a function for providing information about the atmospheric pressure, the humidity, the temperature or the like).

In one embodiment, the application 370 may include an application (hereinafter, referred to as an 'information exchange application' for convenience of description) for supporting information exchange between the electronic device (e.g., the electronic device 101) and external electronic devices (e.g., the external electronic devices 102 and 104). The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an Email application, a healthcare application, an environmental information application or the like) of the electronic device, to the external electronic devices (e.g., the external electronic devices 102 and 104). Further, the notification relay application may, for example, receive notification information from an external electronic device, and provide the received notification information to the user.

The device management application may, for example, manage at least one function (e.g., a function of adjusting the turn-on/off of the external electronic device itself (or some components thereof) or the brightness (or the resolution) of the display) of the external electronic device (e.g., the external electronic devices 102 and 104) communicating with the electronic device, and may manage (e.g., install, delete or update) an application operating in the external electronic device or a service (e.g., a call service or a messaging service) provided in the external electronic device.

In one embodiment, the application 370 may include an application (e.g., a healthcare application for a mobile medical device) that is specified depending on the properties (indicating that the type of the electronic device is the mobile medical device) of the external electronic device (e.g., the external electronic devices 102 and 104). In one embodiment, the application 370 may include an application received or downloaded from the external electronic device (e.g., the server 106 or the external electronic devices 102 and 104). In one embodiment, the application 370 may include a preloaded application or a third party application that can be downloaded from the server. The names of the components of the illustrated program module 310 may vary depending on the type of the operating system.

In one embodiment, at least a part of the program module 310 may be implemented by software, firmware, hardware or a combination thereof. At least a part of the program module 310 may, for example, be implemented (e.g., executed) by a processor (e.g., the processor 210). At least a part of the program module 310 may include, for example, a module, a program, a routine, an instruction set or a process, for performing one or more functions.

Figure 4:
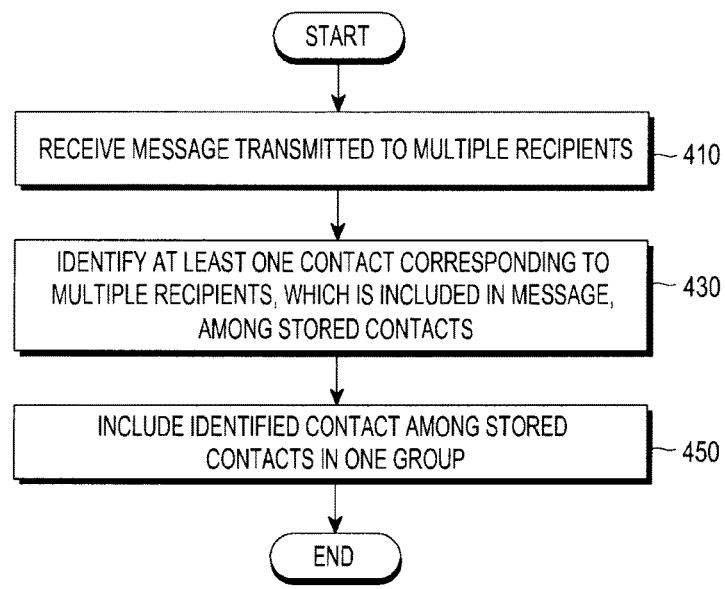
FIG. 4 illustrates a flowchart of an operation for specifying a group of contacts according to one embodiment of the present disclosure.

FIG. 4 illustrates a flowchart of an operation for specifying a group of contacts in an electronic device (e.g., the electronic device 101) according to one embodiment of the present disclosure.

In operation 410, the electronic device may receive a message transmitted to a plurality of recipients.

In one embodiment, the message may include an electronic mail, an instant message, a short message or a multi-media message. The message may include the contacts of the plurality of recipients.

In operation 430, the electronic device may identify at least one contact corresponding to the plurality of recipients, which is included in the message, among the contacts stored in memory of the electronic device 101.

The contact may include, for example, a name, and a phone number, a specific messenger ID, a specific social networking service's account ID, an address, an Email address, and/or a phone corresponding to the name.

In one embodiment, the electronic device may identify at least one contact matching the plurality of recipients, among the stored contacts.

In operation 450, the electronic device may include the identified contact among the stored contacts in a group.

In one embodiment, the electronic device may display information corresponding to the identified contact on a display (e.g., the display 160) of the electronic device. Further, the electronic device may display, on the display, a user interface to receive a user input to group the identified contact in the group. Further, if the user interface is selected based on a user input, the electronic device may group the identified contact in the group.

The user interface may include an icon, a button, a menu item or the like.

In one embodiment, the electronic device may additionally display a screen corresponding to the group.

The screen corresponding to the group may include a name of the group, and a list of contacts included in the group. The name of the group may be a specified default name (e.g., friends, family, colleagues or others) set by an algorithm executed by a processor in the electronic device. For example, the algorithm may analyze the contents of the message to determine that, for example, the group is a group of colleagues of the user. Alternatively, the user may enter the name of the group.

Further, the screen corresponding to the group may include a portion in which the name of the group can be entered, and a list of the contacts included in the group. The name of the group may be set by the user entering the name of the group.

Figure 5:
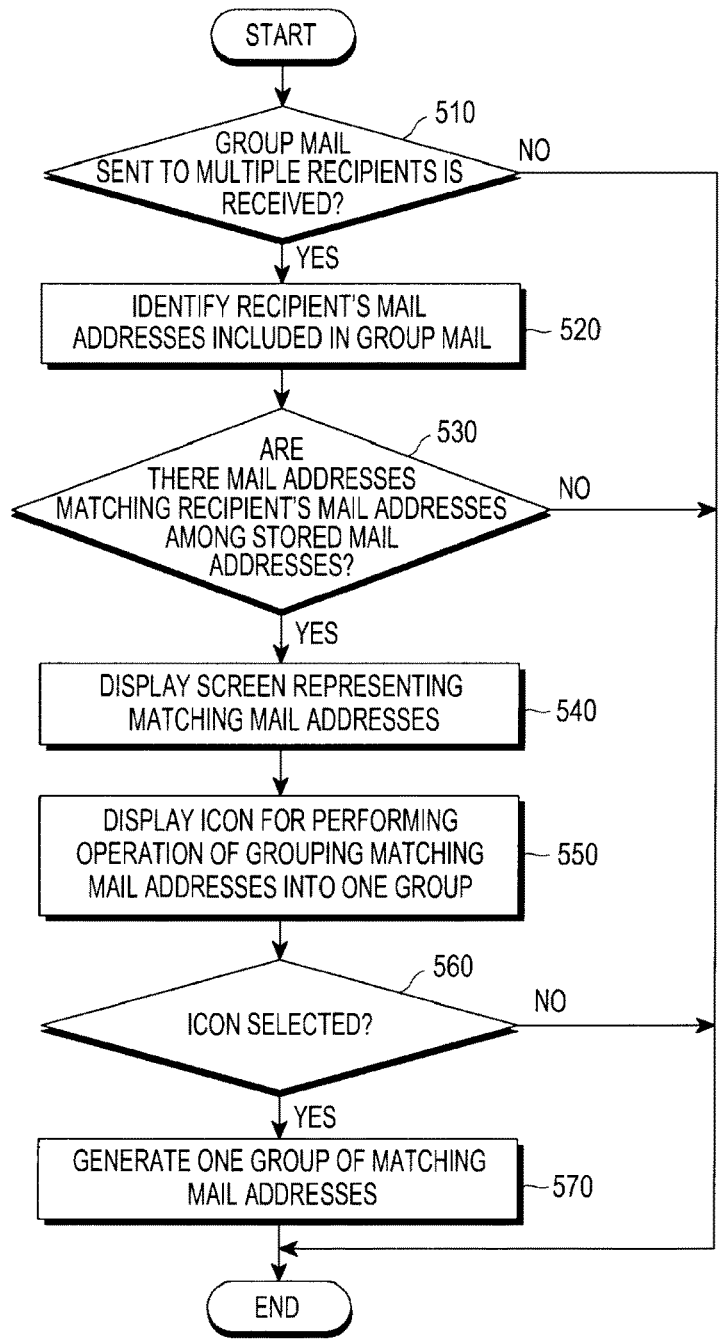
FIG. 5 illustrates a flowchart of a group specifying operation based on group mail reception according to one embodiment of the present disclosure.

FIG. 5 illustrates a flowchart of a group specifying operation based on group mail reception according to one embodiment of the present disclosure.

In operation 510, the electronic device (e.g., the electronic device 101) may determine whether the electronic device has received a group mail transmitted to a plurality of recipients. If it is determined in operation 510 that the electronic device has received the group mail, the electronic device may perform operation 520. Otherwise, the electronic device may end the operation in this embodiment.

In operation 520, the electronic device may identify recipient's mail addresses included in the group mail.

In operation 530, the electronic device may determine whether there are mail addresses (or a mail address) matching the recipient's mail addresses among the mail addresses stored in memory. If it is determined in operation 530 that there are mail addresses matching the recipient's mail addresses among the mail addresses stored in memory, the electronic device may perform operation 540. Otherwise, the electronic device may end the operation in this embodiment.

In operation 540, the electronic device may display the matching mail addresses on the screen so that the user may view the matching mail addresses. For example, the matching mail addresses may be displayed in a list.

In operation 550, the electronic device may display an icon for performing an operation by the user of grouping the matching mail addresses into one group.

In operation 560, the electronic device may determine whether the icon is selected, depending on a user input. If the icon is selected in operation 560, the electronic device may perform operation 570. Otherwise, the electronic device may end the operation of the present disclosure.

In operation 570, the electronic device may generate a group for the matching mail addresses and display the group. For example, in the case of a work mail message, the electronic device may generate a "colleague" group and display the mail addresses in the group in a list.

Figure 6:
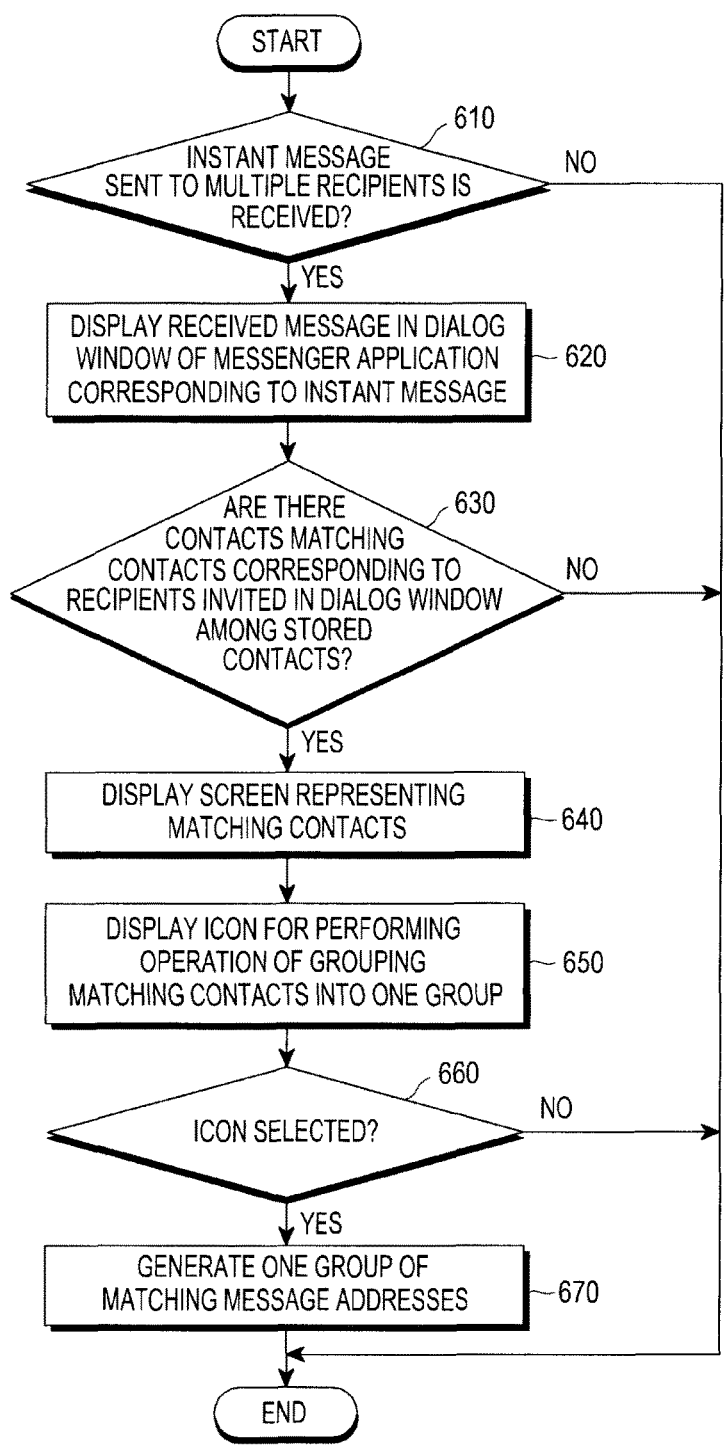
FIG. 6 illustrates a flowchart of a group specifying operation based on instant message reception according to one embodiment of the present disclosure.
Figures 7A, 7B, 7C:
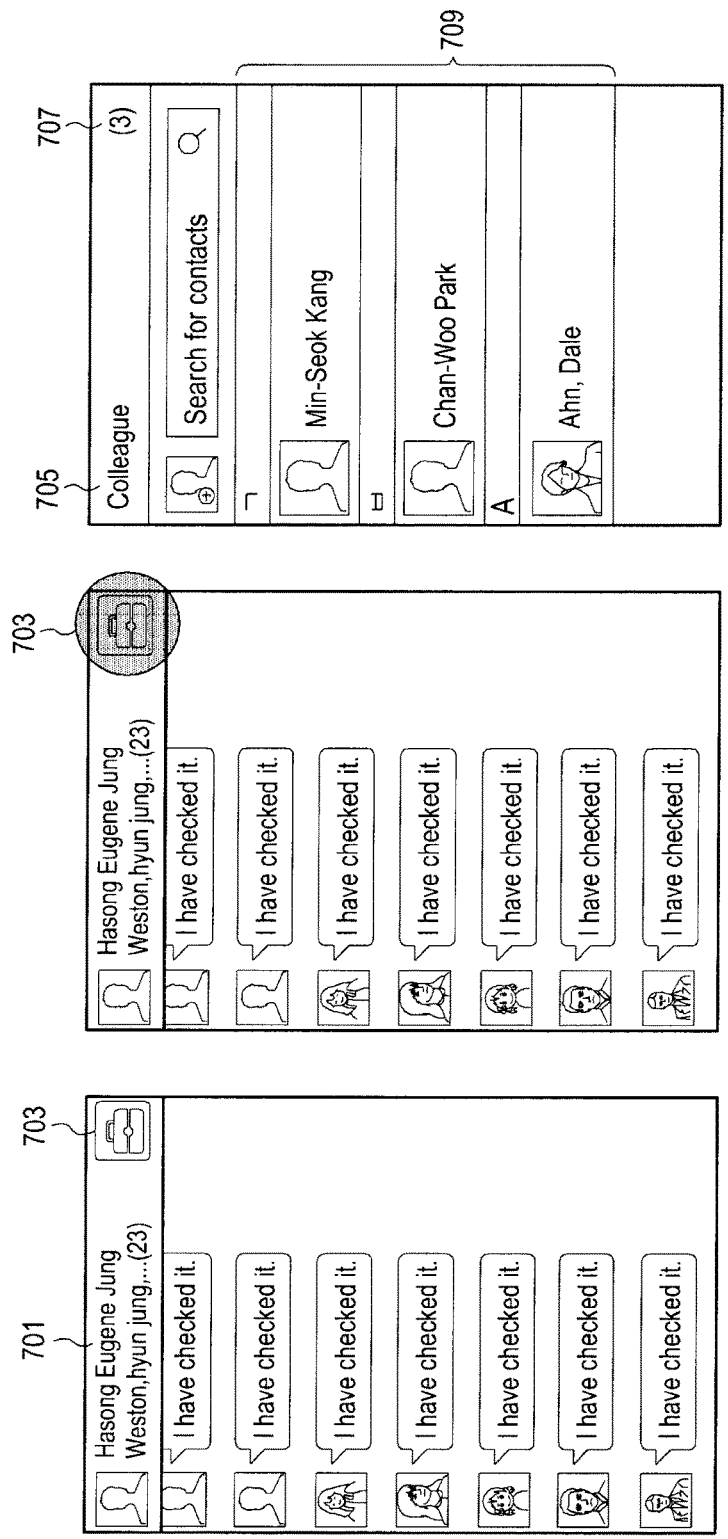
FIG. 7A, FIG. 7B and FIG. 7C illustrate screens for a group specifying operation based on instant message reception according to one embodiment of the present disclosure.

FIG. 6 illustrates a flowchart of a group specifying operation based on instant message reception according to one embodiment of the present disclosure, and FIGS. 7A to 7C illustrate screens for a group specifying operation based on instant message reception according to one embodiment of the present disclosure.

In operation 610, the electronic device may determine whether an instant message transmitted to a plurality of recipients has been received. If it is determined that the instant message has been received, the electronic device may perform operation 620. Otherwise, the electronic device may end the operation in this embodiment.

In operation 620, the electronic device may display the received message in a dialog window of a messenger application corresponding to the instant message.

In operation 630, the electronic device may determine whether there are contacts (or a contact) matching the contacts corresponding to the recipients invited in the dialog window, among the contacts stored in memory. If it is determined in operation 630 that there are contacts in memory matching the contacts corresponding to the recipients invited in the dialog window, then the electronic device may perform operation 640. Otherwise, the electronic device may end the operation in this embodiment.

In operation 640, the electronic device may display a screen showing the matching contacts. The screen showing the matching contacts may be displayed as in a predetermined upper part 701 of the dialog window of the application as shown in FIG. 7A. If the matching contacts are too many so that all the matching contacts may not be displayed in the predetermined upper part 701 with a predetermined size (i.e., if the number of the matching contacts is greater than a predetermined number), some of the matching contacts may be omitted. Further, in response to a user input, the electronic device may increase the size of the predetermined upper part 701 of the dialog window to display the matching contacts, or may display the matching contacts on the screen in a pop-up window, allowing the user to view all the matching contacts including the omitted contacts.

In operation 650, the electronic device may display an icon for performing an operation by the user of grouping the matching contacts into one group. The icon 703 may be displayed on a side of the predetermined upper part 701 of the dialog window of the application as shown in FIG. 7A.

In operation 660, the electronic device may determine whether the icon has been selected, depending on a user input. If it is determined in operation 660 that the icon has been selected, the electronic device may perform operation 670. Otherwise, the electronic device may end the operation in this embodiment. For example, if the icon 703 is selected by a touch input as shown in FIG. 7B, the electronic device may perform operation 670.

In operation 670, the electronic device may generate a group for the matching contacts and display the group. The generated group may be displayed as shown in FIG. 7C. Referring to FIG. 7C, the generated group may be displayed as a screen including a group name 705, the number 707 of contacts included in the group, and a list 708 of the contacts.

Figure 8:
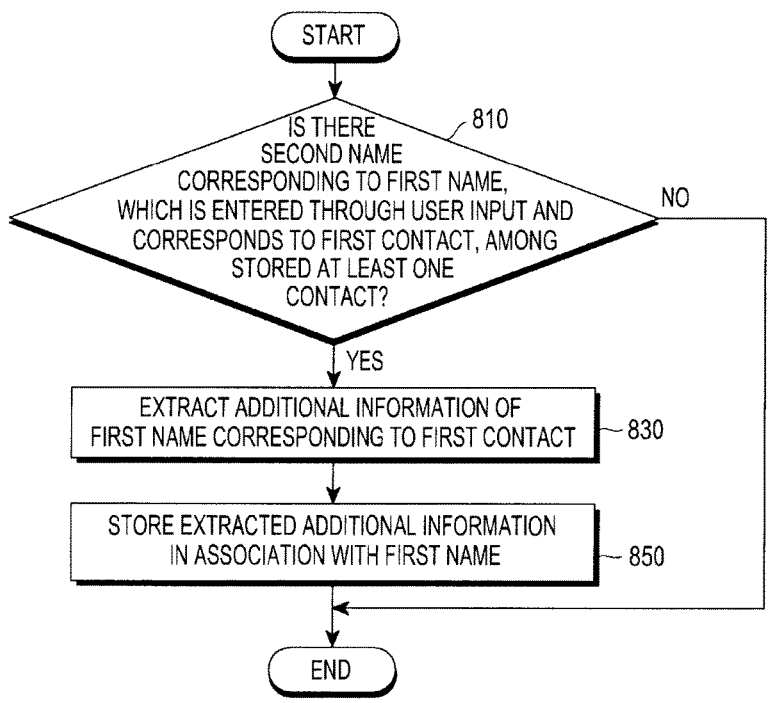
FIG. 8 illustrates a flowchart of a contact distinguishing operation according to one embodiment of the present disclosure.

FIG. 8 illustrates a flowchart of a contact distinguishing operation of an electronic device (e.g., the electronic device 101) according to one embodiment of the present disclosure.

In operation 810, the user enters a first name corresponding to a first contact. Previously, the user may have entered a second contact having a second name into the electronic device and the electronic device may have stored the second contact in memory. In operation 810, the electronic device may determine whether the second name corresponds to the first name. If it is determined in operation 810 that the second name corresponds to the first name, the electronic device may perform operation 830. Otherwise, the electronic device may end the operation of the present disclosure.

In one embodiment, the electronic device may display a contact entry screen on the display of the electronic device. The contact entry screen may be a screen that allows the user to enter and save contacts in a contact application, a messenger application or an Email application of the electronic device.

In one embodiment, when a user input for storing the first contact is detected, the electronic device may determine whether the second name corresponds to the first name.

In one embodiment, the second name corresponding to the first name may be the second name matching the first name. For example, when the first name is Min-Soo Kim and the second name is Min-Soo Kim, it can be said that the first name and the second name correspond to each other.

In one embodiment, when the first name includes Last Name and Given Name and the second name includes only Given Name, the second name may be determined to correspond to the first name when the Given Name of the second name matches the Given Name of the first name. For example, when the first name is Min-Soo KIM and the second name is just Min-Soo, it can be said that the first name and the second name correspond to each other.

In one embodiment, when the first name includes only Given Name and the second name includes Last Name and Given Name, the second name may be determined to correspond to the first name when the Given Name of the second name matches the Given Name of the first name. For example, when the first name is Min-Soo and the second name is Min-Soo KIM, it can be said that the first name and the second name correspond to each other.

In operation 830, the electronic device may extract or identify additional information of the first name corresponding to the first contact.

In one embodiment, the additional information may be grouping information such as family, company, friends or others. For example, the additional information for a family member of the user may "family," while the additional information for a colleague of the user may be "company" and "friend."

In one embodiment, the electronic device may identify profile information corresponding to the first contact by accessing at least one of an Email service, a social networking service or a messenger service corresponding to the contact. Further, the electronic device may identify grouping information using the identified profile information. Further, the electronic device may use the grouping information as the additional information.

In one embodiment, the electronic device may use the grouping information entered via user input as the additional information.

In one embodiment, the electronic device may extract the belonging information from the message received from the first contact.

In operation 850, the electronic device may store the additional information in association with the first name. The operation of associating the additional information with the first name may be, for example, an operation of combining content (text, emoticon and the like) corresponding to the additional information with the first name. For example, the content may be combined to be located in a specified position such as in front of the first name or at the end of the first name.

In one embodiment, the electronic device may display the additional information in association with the first name.

In one embodiment, the electronic device may display the additional information and a screen (e.g., a pop-up screen) to ask if the user wishes to associate the additional information with the first name. If the user selects the appropriate user interface (i.e. a button) to associate the additional information with the first name, the electronic device may then associate the additional information with the first name.

On the other hand, in one embodiment, if there is a second name corresponding to the first name, the electronic device may additionally determine whether the first contact corresponds any one of the stored contacts. Further, if the first contact corresponds to none of the stored contacts, the electronic device may extract or identify additional information of the first name.

Further, in one embodiment, the electronic device may extract or identify additional information of the second name. Moreover, the electronic device may store the additional information of the second name in association with the second name.

Further, in one embodiment, the electronic device may display the additional information of the second name in association with the second name.

The additional information of the second name, like the additional information of the first name, may be grouping information such as, for example, family, company, friends or others. Further, the operation of extracting or identifying additional information of the second name and storing the extracted additional information of the second name in association with the second name may be the same method as the additional information-related operation of the first name.

Figure 9:
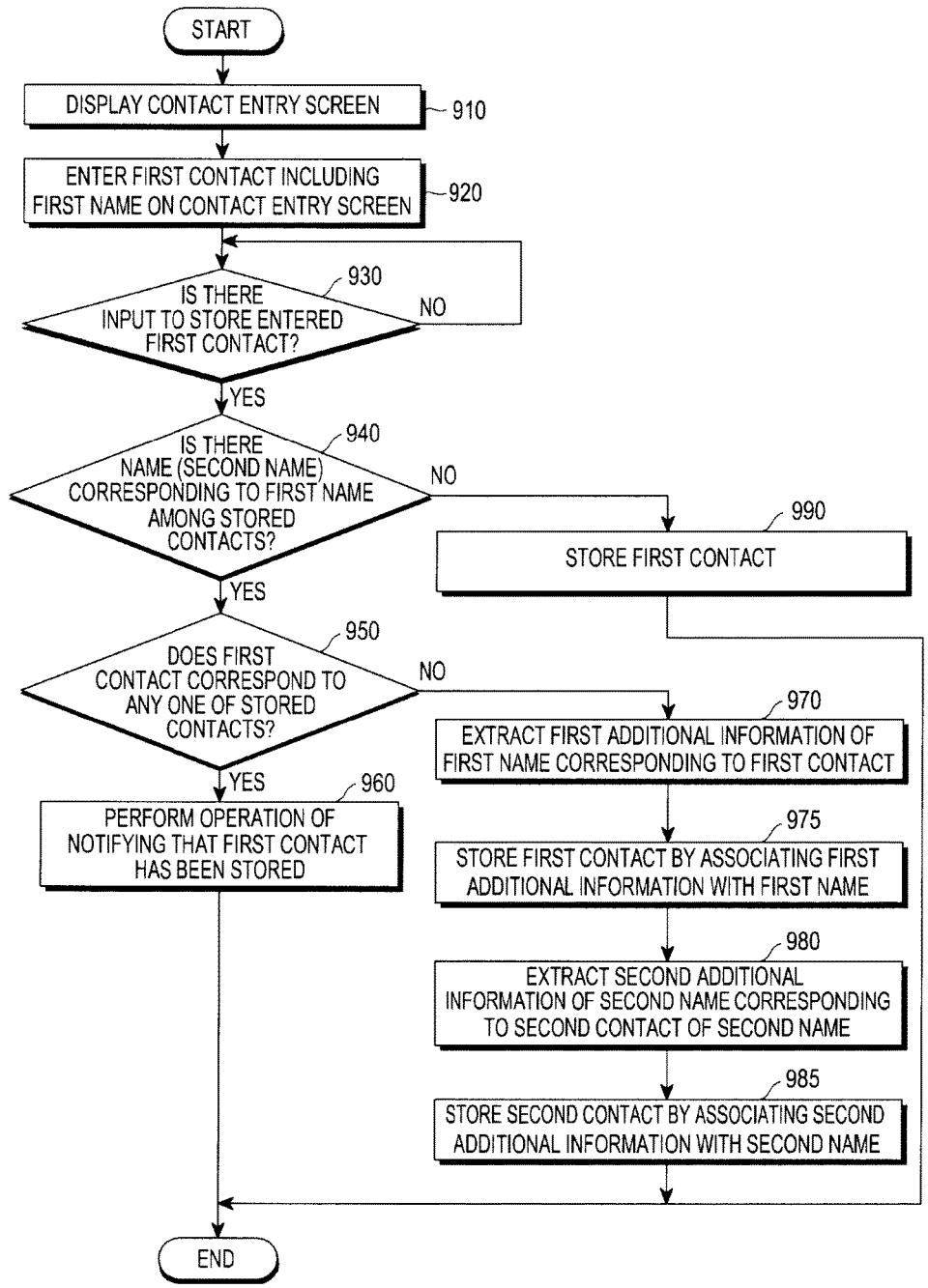
FIG. 9 illustrates a flowchart of an operation of distinguishing contacts sharing the same name according to one embodiment of the present disclosure.
Figures 10A, 10B:
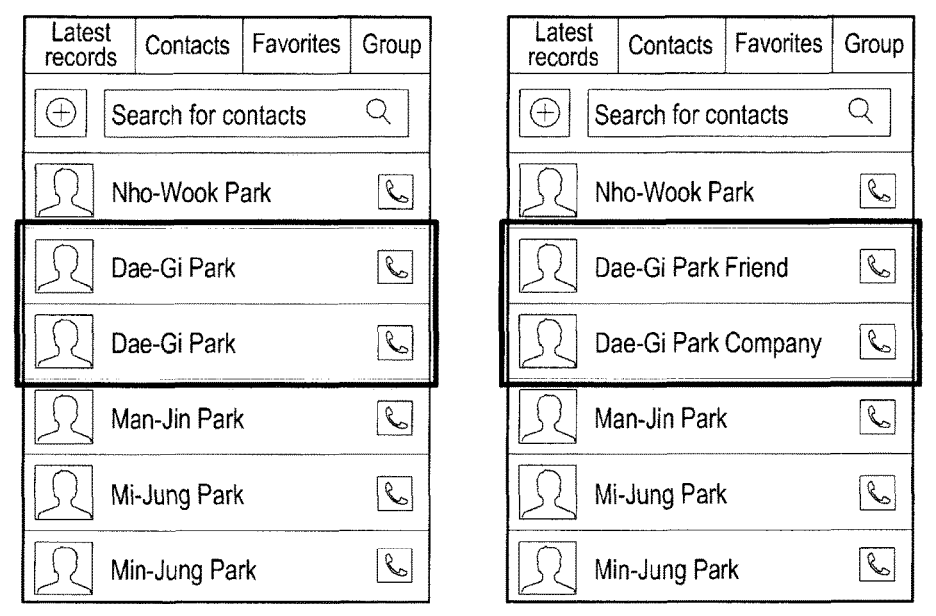

FIG. 9 illustrates a flowchart of an operation of distinguishing contacts sharing the same name according to one embodiment of the present disclosure, and FIGS. 10A and 10B illustrate screens for an operation of distinguishing contacts sharing the same name according to one embodiment of the present disclosure.

Conventionally, when contacts share the same names, the same names are stored and displayed as shown in FIG. 10A, causing confusion to the users. However, according to the embodiment in FIG. 9, when the contacts of the same names are stored, the same names may be automatically sorted by their grouping or affiliations information, so that the contacts may be shown with distinguishing information, as shown in FIG. 10B.

In operation 910, the electronic device may display a contact entry screen on the display of the electronic device.

In operation 920, the user may enter a first contact including a first name on the contact entry screen, which are inputted into the electronic device.

In operation 930, the electronic device may determine whether there is an input to store the entered first contact. If it is determined in operation 930 that there is an input to store the first contact, the electronic device may perform operation 940. Otherwise, the electronic device may perform again operation 930.

In operation 940, the electronic device may determine whether there is a second name in a contact stored in the memory of the electronic device that corresponds to the first name.

If it is determined in operation 940 that there is a correspondence, the electronic device may perform operation 950. Otherwise, the electronic device may store the first contact in operation 990.

In operation 950, the electronic device may determine whether the first contact corresponds to any one of the stored contacts. If it is determined that the first contact corresponds to any one of the stored contacts, the electronic device may perform operation 960. Otherwise, the electronic device may perform operation 970.

In operation 960, the electronic device may perform an operation of notifying the user that the first contact has already been stored. The notifying operation may include a variety of alarm operations such as, for example, displaying on the screen, voice alarm, and/or vibration.

In operation 970, the electronic device may extract or identify a first additional information of the first name corresponding to the first contact. The operation of extracting or identifying additional information has been described above, so a detailed description thereof will be omitted.

In operation 975, the electronic device may store the first contact, including an association between the first additional information with the first name. Referring to FIG. 10B, when the first additional information of Dae-Gi Park that is the first name is Friend, the first name, with which the first additional information is associated, may be "Dae-Gi Park Friend". The operation of storing the additional information in association with the name has been described above, so a detailed description thereof will be omitted.

In operation 980, the electronic device may extract or identify a second additional information of a second name corresponding to a second contact of the second name. The operation of extracting or identifying additional information has been described above, so a detailed description thereof will be omitted.

In operation 985, the electronic device may store the second contact, including an association between the second additional information with the second name. Referring to FIG. 10B, when the second additional information of Dae-Gi Park that is the second name is Company, the second name, with which the second additional information is associated, may be "Dae-Gi Park Company". The operation of storing additional information in association with the name has been described above, so a detailed description thereof will be omitted.

The term 'module' as used herein may refer to a unit that includes, for example, one or a combination of hardware, software or firmware. The term 'module' may be interchangeably used with terms such as, for example, unit, logic, logical block, component, or circuit. The 'module' may be the minimum unit of an integrally constructed part, or a part thereof. The 'module' may be the minimum unit for performing one or more functions, or a part thereof. The 'module' may be implemented mechanically or electronically. For example, the 'module' may include at least one of an application-specific integrated circuit (ASIC) chip, field-programmable gate arrays (FPGAs), or a programmable-logic device, which are known or will be developed in the future, and which perform certain operations. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

At least a part of the apparatus (e.g., modules or functions thereof) or method (e.g., operations) according to various embodiments of the present disclosure may, for example, be implemented by an instruction that is stored in computer-readable storage media in the form of a program module. If the instruction is executed by at least one processor (e.g., the processor 120), the at least one processor may perform a function corresponding to the instruction. The computer-readable storage media may be, for example, the memory 130.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a read only memory (ROM), a random access memory (RAM) or a flash memory). Further, a program instruction may include not only a machine code such as a code made by a compiler, but also a high-level language code that can be executed by the computer using an interpreter. The above-described hardware device may be configured to operate as one or more software modules to perform the operations according to various embodiments of the present disclosure, and vice versa.

A module or a program module according to various embodiments of the present disclosure may include at least one of the above-described components, some of which may be omitted, or may further include additional other components. Operations performed by a module, a program module or other components according to various embodiments of the present disclosure may be performed in a sequential, parallel, iterative or heuristic way. Some operations may be performed in a different order or omitted, or other operations may be added. Embodiments disclosed herein have been presented for description and understanding of the technical details, but it is not intended to limit the scope of the present disclosure. Therefore, the scope of the present disclosure should be construed to include all changes or various other embodiments based on the technical spirit of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

As is apparent from the foregoing description, a method for managing contacts in an electronic device and an electronic device thereof according to various embodiments of the present disclosure may automatically generate a group of contacts stored in the electronic device.

Further, a method for managing contacts in an electronic device and an electronic device thereof according to various embodiments of the present disclosure may separately store contacts having the same names.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:
1. An electronic device, comprising:
a communication interface;
a display,
a memory; and
a processor, coupled to the communication interface, the display and the memory, configured to:
in response to receiving a message sent to a plurality of recipients, identify the plurality of recipients based on recipient information of the message,
obtain contact information corresponding to at least one recipient among the plurality of recipient from contact information stored in the memory,
control the display to display the obtained contact information corresponding to the at least one recipient and an icon for a user input on a screen of the display displaying the message,
in response to receiving the user input by using the icon, generate a group including the obtained contact information of the at least one recipient, and
control the memory to store information on the generated group.

2. The electronic device of claim 1, wherein the message includes an electronic mail, an instant message, a short message or a multi-media message.

3. The electronic device of claim 1, further comprising a display
wherein the processor is configured to control the display to display, on the screen of the display, information related to the group.

4. A method for managing contacts in an electronic device, the method comprising:
in response to receiving a message sent to a plurality of recipient, identifying the plurality of recipient based on recipient information of the message;
obtaining contact information corresponding to at least one recipient among the plurality of recipients from contact information stored in a memory of the electronic device;
controlling a display of the electronic device to display the obtained contact information corresponding to the at least one recipient and an icon for a user input on a screen of the display displaying the message;
in response to receiving the user input by using the icon, generating a group including the obtained contact information of the at least one recipient; and
controlling the memory to store information on the generated group.

5. The method of claim 4, wherein the message includes an electronic mail, an instant message, a short message or a multi-media message.

6. The method of claim 4, further comprising:
controlling the display to display, on the screen of the display, information related to the group.

7. A non-transitory computer-readable storage medium storing instructions that, when executed, cause at least one processor to perform a method for operating an electronic device, the method comprising:
in response to receiving a message sent to a plurality of recipients, identifying the plurality of recipients based on recipient information of the message;
obtaining contact information corresponding to at least one recipient among the plurality of recipients from contact information stored in a memory of the electronic device;
controlling a display of the electronic device to display the obtained contact information corresponding to the at least one recipient and an icon for a user input on a screen of the display displaying the message;
in response to receiving the user input by using the icon, generating a group including the obtained contact information of the at least one recipient; and
controlling the memory to store information on the generated group.

* * * * *